US008635219B2

(12) United States Patent
Chakra et al.

(10) Patent No.: US 8,635,219 B2
(45) Date of Patent: Jan. 21, 2014

(54) AUTOMATED BROWSER HISTORY SORTING BASED UPON LOCATION (75) Inventors: Al Chakra, Apex, NC (US); Peter Demcak, Castleknock (IE); Brendan P. Furey, Balbriggan (IE); Tracy Green, Drogheda (IE); Hugh P. Smyth, Clontarf (IE)

(73) Assignee: International Business Machines Corporation, Armonk, NY (US)

( * ) Notice: Subject to any disclaimer, the term of this patent is extended or adjusted under 35 U.S.C. 154(b) by 784 days.

(21) Appl. No.: 12/198,953

(22) Filed: Aug. 27, 2008

(65) Prior Publication Data

US 2010/0057739 A1  Mar. 4, 2010

(51) Int. Cl.
 *G06F 17/30* (2006.01)
(52) U.S. Cl.
 USPC ........................................... 707/736; 707/752
(58) Field of Classification Search
 USPC .................. 707/752, 728, 748, 851, 769, 736
 See application file for complete search history.

(56) References Cited

U.S. PATENT DOCUMENTS

| 5,960,429 | A | 9/1999 | Peercy et al. |
| 6,275,862 | B1 | 8/2001 | Sharma et al. |
| 6,460,060 | B1 | 10/2002 | Maddalozo, Jr. et al. |
| 6,667,751 | B1 * | 12/2003 | Wynn et al. .................... 715/833 |
| 6,691,163 | B1 | 2/2004 | Tufts |
| 6,834,372 | B1 | 12/2004 | Becker et al. |
| 7,159,023 | B2 | 1/2007 | Tufts |
| 7,162,473 | B2 | 1/2007 | Dumais et al. |
| 7,685,144 | B1 * | 3/2010 | Katragadda ............ 707/999.101 |
| 2003/0154126 | A1 * | 8/2003 | Gehlot et al. .................... 705/14 |
| 2005/0075119 | A1 * | 4/2005 | Sheha et al. ................ 455/456.6 |
| 2007/0162298 | A1 * | 7/2007 | Melton et al. ...................... 705/1 |
| 2007/0162422 | A1 | 7/2007 | Djabarov |

OTHER PUBLICATIONS

Cincom Smalltalk, Browser History, Web site Article, Jan. 29, 2007, pp. 1-4, Cincom Smalltalk, City and State believed to be Cincinnati, OH, USA.
Colas Nahaboo, The Browser History Web Page, Web site, Publication date believed to be Jul. 24, 2000 as provided and printed from web site Jul. 18, 2008, pp. 1-7, Believed published in the USA.
Spectorsoft, Spectorsoft Computer Monitoring Software, Marketing web site, Exact publication date unknown but printed from web site on Jul. 18, 2008, pp. 1-3, Vero Beach, FL, USA.

* cited by examiner

*Primary Examiner* — Leslie Wong
*Assistant Examiner* — Fariborz Khoshnoodi
(74) *Attorney, Agent, or Firm* — Lee Law, PLLC; Christopher B. Lee (57) ABSTRACT A location associated with a computing device is determined. Browser history information is retrieved from a storage device. The browser history information is sorted based upon the determined location. The sorted browser history information is presented to a user of the computing device.

22 Claims, 7 Drawing Sheets

AUTOMATED BROWSER HISTORY SORTING BASED UPON LOCATION

BACKGROUND OF THE INVENTION

1. Field of the Invention

The present invention relates to systems and methods for sorting browser history information. More particularly, the present invention relates to automated browser history sorting based upon location.

2. Related Art

Computer users use browser applications to search for web sites and information on the Internet. Web browsers maintain a history of websites previously visited in the form of a list of uniform resource locators (URLs) associated with those web sites. As users type a web site address within a URL entry text field associated with the browser application, the browser history list may be displayed. When more URLs are available for display within the history list than may be presented to the user within a designated display area, a scroll bar may be presented to the user. The user may scroll down the list of history items to select a URL from the browser history list and access the associated web site.

BRIEF SUMMARY OF THE INVENTION

The subject matter described herein provides automated sorting of browser history information based upon a physical and/or logical location of a computing device, such as a portable computing device. Example physical and/or logical locations include home, work, and school. Furthermore, multiple logical locations may be associated with a single physical location, such as by use of different home office and recreation network connections or different location profiles. One or more location profiles that include sorting, prioritizing, and/or filtering preferences are associated with each location. The location is automatically determined by identification of location information, such as a network sub-address, global positioning satellite (GPS) coordinates, or other location identifier. The user may select a location profile different from the automatically selected location profile. Prioritizing includes presenting browser history information associated with the location before browser history information associated with a different location. Filtering includes presenting only browser history information associated with the physical and/or logical location. Browser history information may be designated and prioritized to be displayed before other sorted or filtered browser history information. Additional information may be associated with the browser history information, such as a number of previous accesses, time accessed, and other web site history information.

A method includes determining a location associated with a computing device, retrieving browser history information from a storage device, sorting the browser history information based upon the determined location, and presenting the sorted browser history information to a user of the computing device.

A system includes a memory adapted to store browser history information; a display adapted to present information; and a computing device programmed to determine a location associated with the computing device, retrieve browser history information from the memory, sort the browser history information based upon the determined location, and present the sorted browser history information to a user of the computing device on the display.

An alternative system includes a memory adapted to store browser history information; a display adapted to present information; and a computing device programmed to determine a location associated with the computing device based upon at least one of a sub-network address associated with a network connection of the computing device, global positioning satellite (GPS) coordinates associated with the computing device, and a selected user location profile associated with the computing device, store a value based upon the determined location to a location variable within the memory, retrieve browser history information from the memory, sort the browser history information based upon the determined location represented by the value stored to the location variable within the memory, prioritize the browser history information to place browser history information elements associated with the determined location before browser history information elements associated with a different location, store the sorted browser history information to the memory, and present the sorted browser history information to a user of the computing device on the display.

A computer program product includes a computer useable medium including a computer readable program. The computer readable program when executed on a computer causes the computer to determine a location associated with the computing device, retrieve browser history information from the memory, sort the browser history information based upon the determined location, and present the sorted browser history information to a user of the computing device on the display.

Those skilled in the art will appreciate the scope of the present invention and realize additional aspects thereof after reading the following detailed description of the preferred embodiments in association with the accompanying drawing figures.

BRIEF DESCRIPTION OF THE SEVERAL VIEWS OF THE DRAWINGS

The accompanying drawing figures incorporated in and forming a part of this specification illustrate several aspects of the invention, and together with the description serve to explain the principles of the invention.

DETAILED DESCRIPTION OF THE INVENTION

The examples set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The subject matter described herein provides automated sorting of browser history information based upon a physical and/or logical location of a computing device, such as a portable computing device. Example physical and/or logical locations include home, work, and school. Furthermore, multiple logical locations may be associated with a single physical location, such as by use of different home office and recreation network connections or different location profiles. One or more location profiles that include sorting, prioritizing, and/or filtering preferences are associated with each location. The location is automatically determined by identification of location information, such as a network sub-address, global positioning satellite (GPS) coordinates, or other location identifier. The user may select a location profile different from the automatically selected location profile. Prioritizing includes presenting browser history information associated with the location before browser history information associated with a different location. Filtering includes presenting only browser history information associated with the physical and/or logical location. Browser history information may be designated and prioritized to be displayed before other sorted or filtered browser history information. Additional information may be associated with the browser history information, such as a number of previous accesses, time accessed, and other web site history information.

Figure 1:
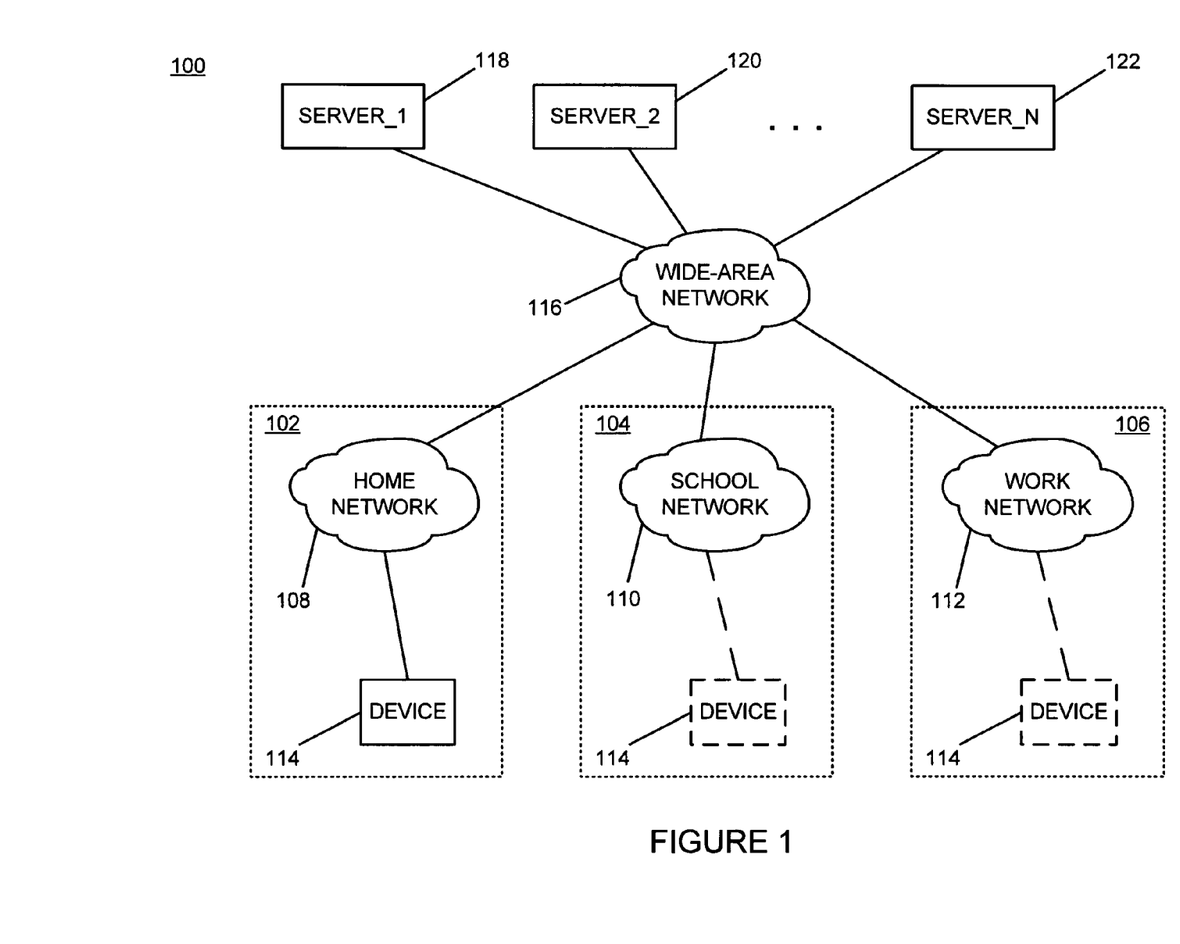
FIG. 1 is a block diagram of an example of an implementation of a system for automated sorting of browser history information based upon a physical and/or logical location of a computing device according to an embodiment of the present subject matter.

FIG. 1 is a block diagram of an example of an implementation of a system 100 for automated sorting of browser history information based upon a physical and/or logical location of a computing device. Within the system 100, a home environment 102, a school environment 104, and a work environment 106 are illustrated, each including a home network 108, a school network 110, and a work network 112, respectively. A computing device 114 is illustrated within the home environment 102. The computing device 114 is also represented within the school environment 104 and the work environment 106 with a dashed-line representation to illustrate that the computing device 114 may be moved to each of these environments by a user of the computing device 114.

As will be described in more detail below in association with FIGS. 2 through 9, the computing device 114 provides automated sorting of browser history information based upon a physical and/or logical location of a computing device within a system, such as the system 100. The automated sorting of the browser history information is based upon which environment the computing device 114 is presently located within (e.g., the home environment 102, the school environment 104, and the work environment 106). The automated sorting of the browser history information may also be based upon a location profile associated with each location that includes sorting priority and/or filtering preferences for the location. The user may override the automated location profile selection if the user wishes.

It should be noted that the computing device 114 may be a portable computing device, either by a user's ability to move the computing device 114 to different locations, such as the home environment 102, the school environment 104, and the work environment 106, or by the computing device 114's association with a portable platform, such as a plane, train, automobile, or other moving vehicle. It should also be noted that the computing device 114 may be any computing device capable of processing information as described above and in more detail below. For example, the computing device 114 may include devices such as a personal computer (e.g., desktop, laptop, palm, etc.) or a handheld device (e.g., cellular telephone, personal digital assistant (PDA), email device, music recording or playback device, etc.), or any other device capable of processing information as described in more detail below.

The home network 108, the school network 110, and the work network 112 are each interconnected via a wide-area network 116 to a server_1 118, a server_2 120, through a server_N 122. The server_1 118 through the server_N 122 provide web content that may be accessed by the computing device 114 at each of the home environment 102, the school environment 104, and the work environment 106. As such, the server_1 118 through the server_N 122 represent web servers and other content servers for purposes of the present description.

As described above, the automated sorting of the browser history information by the computing device 114 may also be based upon a location profile associated with each location that includes sorting priority and/or filtering preferences for the location. As such, a user of the computing device 114 may prioritize servers, such as the server_1 118 through the server_N 122, to access from the various locations. The user may also override the automated location profile selection if the user wishes. For example, the user may override the automated location profile selection while located within the home environment 102 to perform employment-related work and access employment-related content servers.

The home network 108, the school network 110, and the work network 112 each include any form of interconnection suitable for the intended purpose, including a private or public network such as an intranet or the Internet, respectively, direct inter-module interconnection, dial-up, or any other interconnection mechanism capable of interconnecting the devices with the wide-area network 116. The wide-area network 116 may be any wide-area network, including the Internet.

Figure 2:
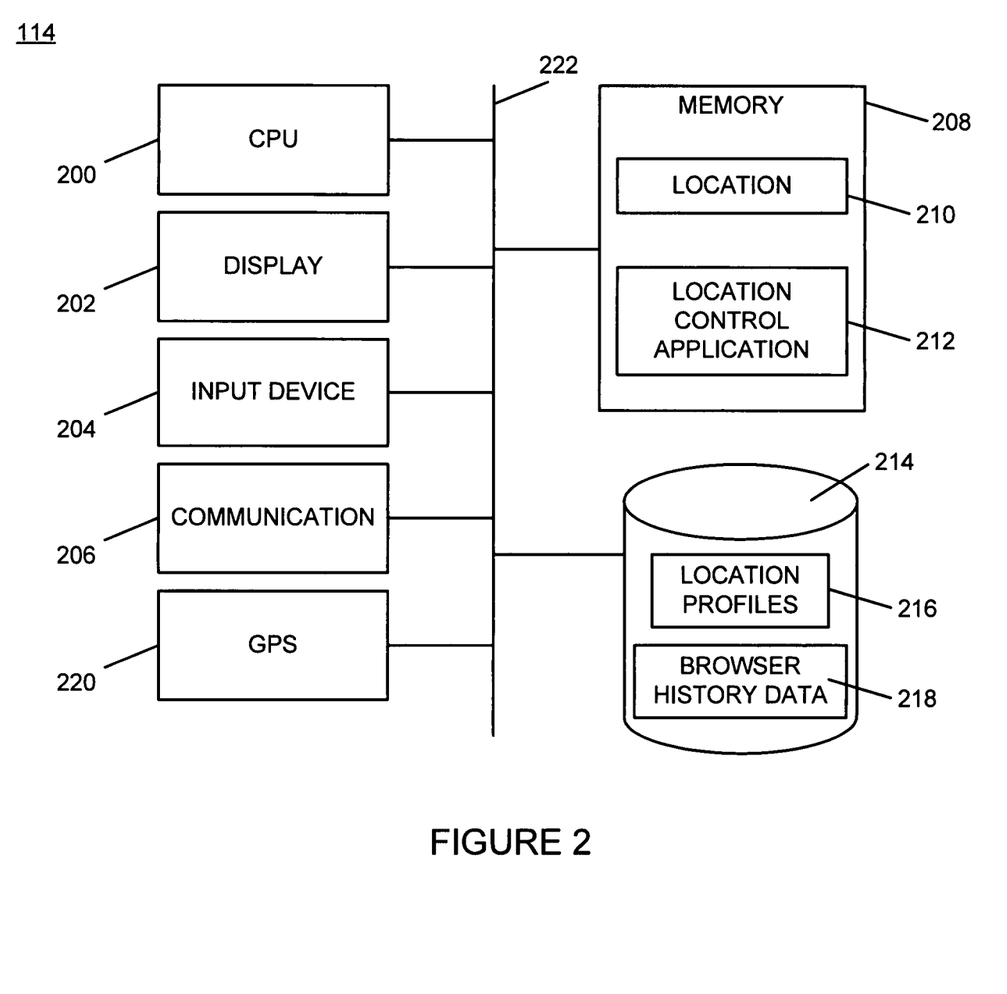
FIG. 2 is a block diagram of an example of an implementation of the computing device that is capable of performing automated sorting of browser history information based upon a physical and/or logical location of the computing device according to an embodiment of the present subject matter.

FIG. 2 is a block diagram of an example of an implementation of the computing device 114 that is capable of performing automated sorting of browser history information based upon a physical and/or logical location of the computing device 114. A central processing unit (CPU) 200 provides computer instruction execution, computation, and other capabilities within the computing device 114. A display 202 provides visual information to a user of the computing device 114 and an input device 204 provides input capabilities for the user.

The display 202 may include any display device, such as a cathode ray tube (CRT), liquid crystal display (LCD), light emitting diode (LED), projection, touchscreen, or other display element or panel. The input device 204 may include a computer keyboard, a keypad, a mouse, a pen, a joystick, or any other type of input device by which the user may interact with and respond to information on the display 202.

A communication module 206 provides interconnection capabilities that allow the computing device 114 to communicate with other modules within the system 100, such as the server_1 118 through the server_N 122, to retrieve web content. The communication module 206 may include any electrical, protocol, and protocol conversion capabilities useable to provide the interconnection capabilities. Though the communication module 206 is illustrated as a component-level module for ease of illustration and description purposes, it should be noted that the communication module 206 includes any hardware, programmed processor(s), and memory used to carry out the functions of the communication module 206 as described above and in more detail below. For example, the communication module 206 may include additional controller circuitry in the form of application specific integrated circuits (ASICs), processors, antennas, and/or discrete integrated circuits and components for performing communication and electrical control activities associated with the communication module 206. Additionally, the communication module 206 also includes interrupt-level, stack-level, and application-level modules as appropriate. Furthermore, the communication module 206 includes any memory components used for storage, execution, and data processing for performing processing activities associated with the communication module 206. The communication module 206 may also form a portion of other circuitry described without departure from the scope of the present subject matter.

A memory 208 includes a location indicator storage area 210 that stores a value representative of the present physical and/or logical location of the computing device 114. As will be described in more detail below, a value stored within the location indicator storage area 210 is used to expedite location profile selection and processing. The memory 208 also includes a location control application 212. The location control application 212 provides location identification, access, sorting, location override, and related capabilities for the computing device 114, as described above and in more detail below. The location control application 212 includes instructions executable by the CPU 200 for performing these functions. The CPU 200 executes these instructions to provide the processing capabilities described above and in more detail below for the computing device 114.

The location control application 212 may form a portion of an interrupt service routine (ISR), a portion of an operating system, a portion of a browser application, or a portion of a separate application without departure from the scope of the present subject matter. The location control application 212 may also create, select, and process location profiles for automated sorting of browser history information based upon a physical and/or logical location of a computing device, such as the computing device 114.

A database 214 is associated with the computing device 114 and provides storage capabilities for information associated with the automated sorting of browser history information based upon a physical and/or logical location of the computing device 114. The database 214 includes a location profile storage area 216 and browser history data storage area 218 that may be stored in the form of tables or other arrangements accessible by the computing device 114. The browser history data storage area 218 includes browser history information associated with accessed web or other servers, such as the server_1 118 through the server_N 122. The browser history data storage area 218 also includes additional information associated with the browser history information, such as a number of previous accesses to a particular site, time or cumulative time accessed, and other web site history information. As will be described in more detail below, location profiles stored within the location profile storage area 216 are used to sort, prioritize, and/or filter the browser history information stored within the browser history data storage area 218.

It is understood that the memory 208 may include any combination of volatile and non-volatile memory suitable for the intended purpose, distributed or localized as appropriate, and may include other memory segments not illustrated within the present example for ease of illustration purposes. For example, the memory 208 may include a code storage area, a code execution area, and a data area without departure from the scope of the present subject matter.

A global positioning system (GPS) module 220 provides positioning location coordinates usable for identifying a physical and/or logical location of the computing device 114. Though the GPS module 220 is illustrated as a component-level module for ease of illustration and description purposes, it should be noted that the GPS module 220 includes any hardware, programmed processor(s), and memory used to carry out the functions of the GPS module 220 as described above and in more detail below. For example, the GPS module 220 may include additional controller circuitry in the form of application specific integrated circuits (ASICs), processors, antennas, and/or discrete integrated circuits and components for performing communication and electrical control activities associated with the GPS module 220. Additionally, the GPS module 220 also includes interrupt-level, stack-level, and application-level modules as appropriate. Furthermore, the GPS module 220 includes any memory components used for storage, execution, and data processing for performing processing activities associated with the GPS module 220. The GPS module 220 may also form a portion of other circuitry described without departure from the scope of the present subject matter.

The CPU 200, the display 202, the input device 204, the communication module 206, the memory 208, the database 214, and the GPS module 220 are interconnected via an interconnection 222. The interconnection 222 may include a system bus, a network, or any other interconnection capable of providing the respective components with suitable interconnection for the respective purpose.

It should be noted that the computing device 114 is described as a portable device for ease of illustration purposes. However, it should be noted that the computing device 114 may be a portable device that may be carried by a user or may be a stationary device located within a moving vehicle, such as a plane, train, automobile, or other vehicle, without departure from the scope of the present subject matter.

When the computing device 114 is a portable device that may be carried by a user, the user of the computing device 114 may wish to work while commuting home within a train or taxi and designate that as he/she approaches home at the end of the commute the location profile associated with the home environment 102 is to be automatically selected. The automated location profile change may be based upon a sub-network address change, GPS coordinate change, or a change in some other location information.

When the computing device 114 is portable by its association with a moving vehicle, location profile selection may be based upon and changed as a result of changes to location information, such as a sub-network address change, GPS coordinate change, or a change in some other location information. In the example of the computing device 114 being portable by its association with a moving vehicle, the components within the computing device 114 may be co-located or distributed and interconnected via a network without departure from the scope of the present subject matter. For a distributed arrangement, the display 202 and the input device 204 may be located at a seat, point of sale device, kiosk, or other location within the vehicle, while the CPU 200 and memory 208 may be located at a local or remote server. Many other possible arrangements for components of the computing device 114 are possible and all are considered within the scope of the present subject matter. It should also be understood that, though the location profile storage area 216 and the browser history data storage area 218 are shown within the database 214, they may also be stored within the memory 208 without departure from the scope of the present subject matter.

Figure 3:
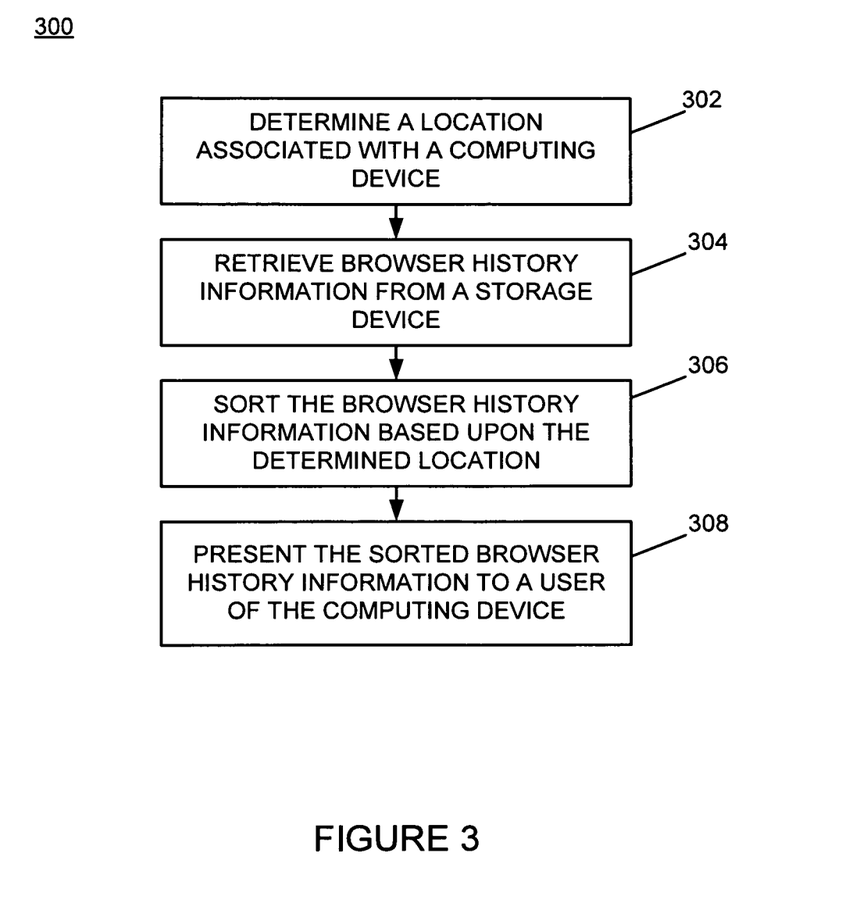
FIG. 3 is a flow chart of an example of an implementation of a process that provides automated sorting of browser history information based upon a physical and/or logical location of a computing device according to an embodiment of the present subject matter.
Figure 4:
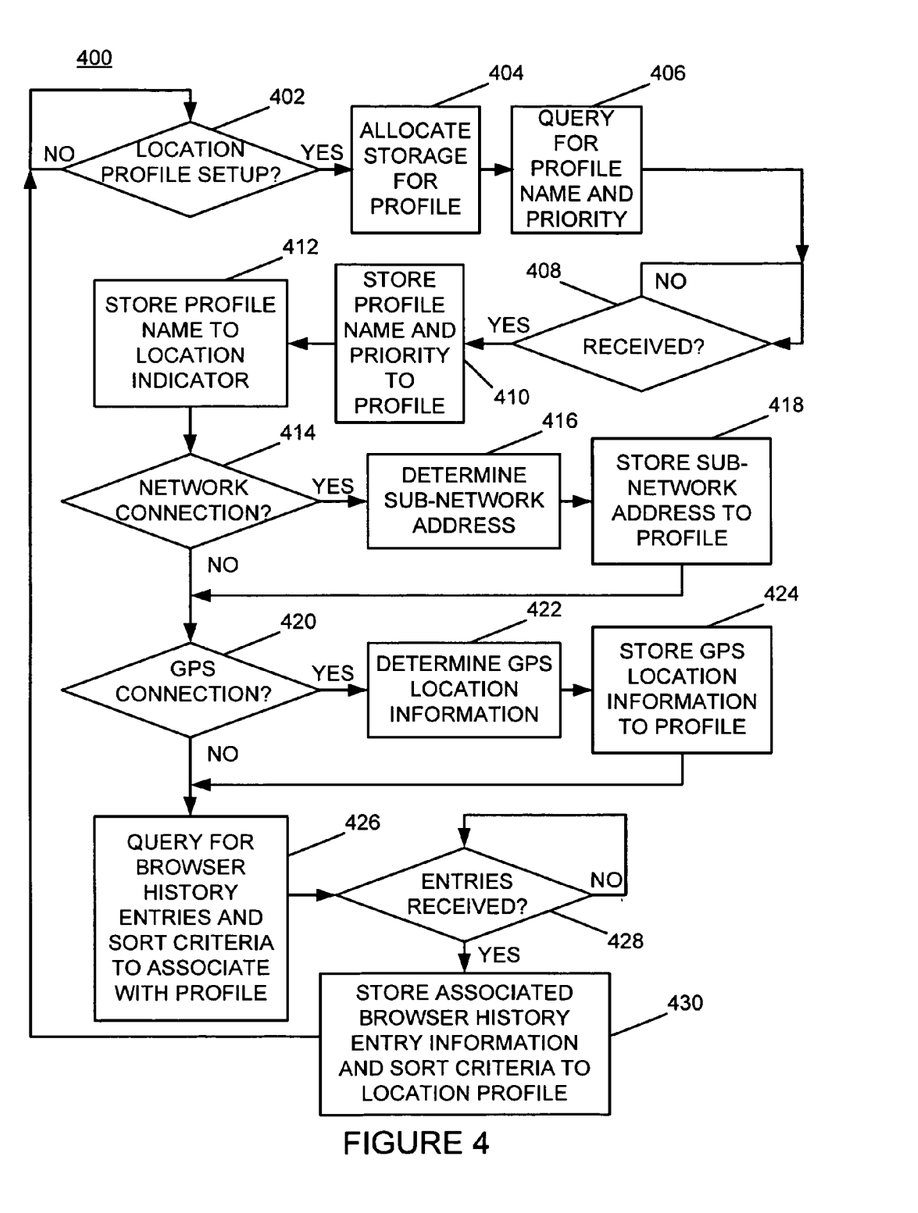
FIG. 4 is a flow chart of an example of an implementation of a process that provides location profile creation and preference selection capabilities for a user of a computing device according to an embodiment of the present subject matter.
Figure 5:
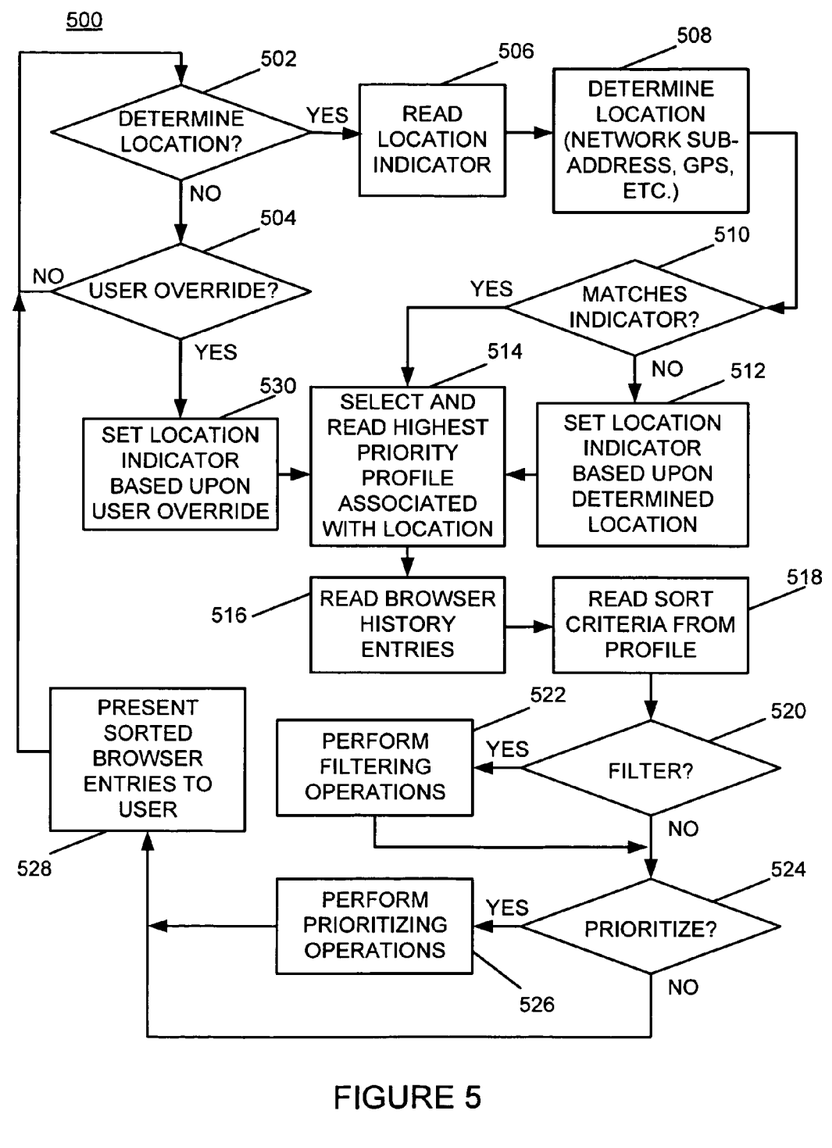
FIG. 5 is a flow chart of an example of an implementation of a process that performs automated sorting, filtering, and prioritizing of location profiles and browser history information based upon a physical and/or logical location of a computing device and user preferences associated with a location profile according to an embodiment of the present subject matter.

Accordingly, the computing device 114 may take many forms and may be associated with many platforms. FIGS. 3 through 5 below describe example processes that may be executed by the computing device 114 to perform the automated sorting of browser history information based upon a physical and/or logical location of the computing device 114.

FIG. 3 is a flow chart of an example of an implementation of a process 300 that provides automated sorting of browser history information based upon a physical and/or logical location of a computing device, such as the computing device 114. The process 300 along with the other processes described below may be executed by any computing device, such as the computing device 114, and may form at least a portion of the location control application 212 executed by the CPU 200. At block 302, the process 300 determines a location associated with the computing device 114. At block 304, the process 300 retrieves browser history information from a storage device. At block 306, the process 300 sorts the browser history information based upon the determined location. At block 308, the process 300 presents the sorted browser history information to a user of the computing device 114.

FIG. 4 is a flow chart of an example of an implementation of a process 400 that provides location profile creation and preference selection capabilities for a user of the computing device 114. At decision point 402, the process 400 waits for a location profile setup action to be requested. For example, a user of the computing device 114 may request a profile setup activity via any available technique, such as a graphical user interface (GUI) dialog box or a sequence of dialog boxes (not shown). Alternatively, when the computing device 114 is moved to a location that does not have an associated location profile, the process 400 may be triggered to interact with the user to create a location profile.

When a determination is made that a location profile setup action has been requested, the process 400 allocates storage within a storage device, such as the location profile storage area 216 in the database 214 or the memory 208, for a location profile at block 404. At block 406, the process 400 queries the user for a profile name, such as "home," "office," "work," or other identifier, and for a priority to associate with the profile. The priority may be used to rank profiles in importance. For example, a higher priority may be placed on a "work" location profile than on a "home" location profile so that profile processing within the work environment 106 may be expedited.

The process 400 waits at decision point 408 for the profile name and priority to be entered. It should be noted that time out procedures and other error control procedures are not illustrated within the example process 400 for ease of illustration purposes. However, it is understood that all such procedures are considered to be within the scope of the present subject matter for the example process 400 or any other process described.

When a determination is made at decision point 408 that the name and priority have been entered, the process 400 stores the profile name and priority to the allocated location profile storage location at block 410. At block 412, the process 400 stores the location profile name to the location indicator, such as the location indicator storage area 210 within the memory 208. As described above and in more detail below in association with FIG. 5, the value stored within the location indicator storage area 210 is used to expedite certain location profile processing activities.

At decision point 414, the process 400 makes a determination as to whether an active network connection is associated with the computing device 114. If a determination is made that there is an active network connection, the process 400 determines the sub-network address of the active network at block 416. The sub-network address may include a portion of an Internet protocol (IP) address, such as a designated IP address routing prefix, subnet mask, network identifier, subnet identifier, or other identifier, associated with a router or other device through which the computing device 114 is connected to the active network. For purposes of the present description, the sub-network address includes any characteristic of a network connection that distinguishes the active network connection from other network connections the computing device 114 may connect through as it is moved between network environments. At block 418, the process 400 stores the determined sub-network address to the location profile.

When the sub-network address is stored to the location profile or when a determination is made at decision point 414 that an active network connection is not presently available, the process 400 makes a determination at decision point 420 as to whether an active GPS connection is associated with the computing device 114. When a determination is made that there is an active GPS connection associated with the computing device 114, the process 400 determines GPS location information, such as by querying for and receiving GPS coordinates from the GPS module 220, at block 422. A detailed description of GPS technology is not provided herein for brevity. However, a person of skill in the art will be able to retrieve GPS location information from a GPS module, such as the GPS module 220, based upon the description provided herein. At block 424, the process 400 stores the GPS location information to the location profile.

When the GPS location information is stored to the location profile or when a determination is made at decision point 420 that an active GPS connection is not presently available, the process 400 queries a user of the computing device 114 for browser history entries and sort criteria to associate with the location profile at block 426. For example, the process 400 may display a list of all browser history information read from the browser history data storage area 218 of the database 214 within a GUI dialog box or sequence of dialog boxes. The user may then be allowed to identify certain items of browser history information to associate with the location profile.

Additionally, the process 400 may display selections for sort criteria, such as priority and filtering criteria that may be associated with the location profile. Location profiles may be prioritized so that multiple location profiles may be associated with a given location. In this manner, location profiles may be prioritized by connection type (e.g., network or dialup), project, project deadline schedules, or prioritized for any other purpose. Filtering options may be selected for each location profile, such as to filter by connection type (e.g., network or dialup), project, project deadline schedule, or any other filtering option.

It should be understood that many additional editing capabilities for the browser history information are possible, but are not illustrated within FIG. 4 for ease of illustration purposes. For example, the process 400 may allow the user to designate certain items of the browser history information with priorities. In this example, the priorities associated with certain items of browser history information may be used to cause these items to be displayed at the top, bottom, or other location within displayed browser history information associated with the location profile independent of other sorting techniques. Accordingly, all such other editing capabilities are considered within the scope of the present subject matter.

The process 400 waits at decision point 428 for all browser history entries and additional editing selections to be received from the user. When a determination is made that all browser history entries and additional editing selections have been received, the process 400 stores the associated browser history entry information and associated sort criteria to the location profile at block 430. For example, the browser history entries that have been associated with the location profile may be stored within the location profile storage area 216 in the database 214 as a part of the location profile itself. Alternatively, browser history entries stored within the browser history data storage area 218 may be tagged or flagged with an indicator, such as a priority or profile indicator, to indicate that they are associated with the location profile. Tagging or flagging entries may conserve storage space by not duplicating browser history information to create the location profile. Additionally, browser history entries associated with location profiles may be stored within separate tables to indicate location profile associations for the browser history entries. Many other possibilities exist for structuring and storing the location profile information and all are considered within the scope of the present subject matter. After the process 400 stores the associated browser history entry information and sort criteria to the location profile at block 430, the process 400 returns to decision point 402 to await another location profile setup request.

As such, the process 400 provides location profile creation and preference selection capabilities for a user of the computing device 114. The location profile creation activities include determining location information associated with active network or GPS connections and allowing a user of the computing device 114 to associate preferences for sorting, filtering, and prioritizing browser history information with the created location profile.

FIG. 5 is a flow chart of an example of an implementation of a process 500 that performs automated sorting, filtering, and prioritizing of location profiles and browser history information based upon a physical and/or logical location of the computing device 114 and user preferences associated with a location profile. The process 500 waits at decision point 502 for an indication or request to determine the present location of the computing device 114. For example, the indication may result from the computing device 114 being powered up. Alternatively, a request may be triggered by a user of the computing device 114 in response to the user enabling the location profile capabilities of the present subject matter. Additionally, a request may be triggered when the computing device 114 is active while located on a moving vehicle that has moved from or to a new physical and/or logical location. Many other indication or request triggers are possible for the process 500 and all are considered within the scope of the present subject matter.

When a determination is made that an indication or request to determine the present location of the computing device 114 has not been received, the process 500 makes a determination as to whether a user override has been received at decision point 504. A user override may result from a user selecting a location profile other than the automatically selected location profile, such as when the user wishes to access browser history information associated with a location profile for the work environment 106 while located within the home environment 102. FIGS. 6 through 9 below provide more detail associated with this example user override activity. When a determination is made that a user override has not been received at decision point 504, the process 500 returns to decision point 502 to determine whether an indication or request to determine the present location has been received as described above. The process 500 iterates until either an indication or request is received at decision point 502 or a user override has been received at decision point 504.

When a determination is made at decision point 502 that an indication or request to determine the present location of the computing device 114 has been received, the process 500 reads a location indicator, such as the location indicator storage area 210 in the memory 208, to retrieve a present value of the location indicator at block 506. At block 508, the process 500 determines the location associated with the computing device 114, such as by determining a sub-network address or GPS coordinates associated with the computing device 114. Details associated with processing to determine the location associated with the computing device 114 are described above in association with FIG. 4 and are not repeated within FIG. 5 for brevity.

At decision point 510, the process 500 makes a determination as to whether the determined location matches the location indicator. When a determination is made that the determined location does not match the location indicator, the process 500 sets the location indicator based upon the determined location at block 512. When the location indicator has been set or when a determination is made that the determined location matches the location indicator, the process 500 automatically selects and reads the highest priority profile associated with the location at block 514. For example, the process 500 may read the highest priority profile associated with the location from the location profile storage area 216 stored within the database 214. As described above, location profiles may be prioritized so that multiple location profiles may be associated with a given location. In this manner, location profiles may be prioritized by connection type (e.g., network or dialup), project, project deadline schedules, or prioritized for any other purpose.

At block 516, the process 500 reads browser history entries associated with the automatically selected profile. As described above, the browser history entries associated with the automatically selected location profile may be stored within the location profile storage area 216 or within the browser history data storage area 218 as separate tables or within a single table with tags or priority flags to indicate location profile associations for the browser history entries.

At block 518, the process 500 reads any sort criteria from the selected location profile. For example, any priority or filtering information associated with the profile or with the associated browser history information may be read from the location profile and utilized as described above and in more detail below. At decision point 520, the process 500 makes a determination as to whether any filtering has been established for the location profile. When a determination is made that filtering has been established for the location profile, the process 500 performs the associated filtering at block 522. For example and as described above, when the browser history information is stored within the browser history data storage area 218 within a single table, filtering may be performed based upon any tags or flags associated with the location profile and browser history entries to select browser history information for the location profile. Additionally, any browser history entries not associated with the location profile may be removed from the list presented to the user of the computing device 114. As described above, many other filtering possibilities exist for filtering the browser history information and all are considered within the scope of the present subject matter.

When a determination is made at decision point 520 that filtering has not been established for the location profile or when the established filtering has been completed, the process 500 makes a determination as to whether any priority criteria have been associated with the selected location profile at decision point 524. For example and as described above, location profiles may be prioritized such that even where multiple location profiles are associated with a physical and/or logical location, certain location profiles may take precedence over other location profiles. Additionally, certain browser history entries may be prioritized over other browser history entries to be placed higher within a displayed browser history list independently of other sorting or filtering operations. As described above, many other possibilities exist for prioritizing location profiles and browser history information and all are considered within the scope of the present subject matter.

When a determination is made at decision point 524 that priority criteria have been associated with the selected location profile, the process 500 performs the associated prioritizing operations at block 526. When a determination is made that no priority criteria have been associated with the selected location profile or when the prioritizing operations have been completed at block 526, the process 500 presents the sorted browser entries to the user on the display 202 at block 528. The process 500 returns to decision points 502 and 504 to iterate as described above.

Returning to the description of decision point 504, when a determination is made that a user override has been requested, the process 500 sets the location indicator based upon the user-selected location or location profile at block 530. The process 500 continues to block 514 and operates as described above, and returns to iterate between decision points 502 and 504 to determine whether additional actions are to be performed.

As such, the process 500 performs automated sorting, filtering, and prioritizing of location profiles and browser history information. The process 500 performs the automated sorting, filtering, and prioritizing of the location profiles and browser history information based upon a physical and/or logical location of the computing device 114 and user preferences associated with a location profile. The process 500 allows the user to override automated location profile selection to add flexible user control to the process 500.

FIGS. 6 through 9 below provide a more detailed example of functionality associated with sorting, filtering, and prioritizing browser history information. Additionally, FIGS. 6 through 9 provide a detailed example of the user override capabilities associated with the present subject matter.

Figure 6:
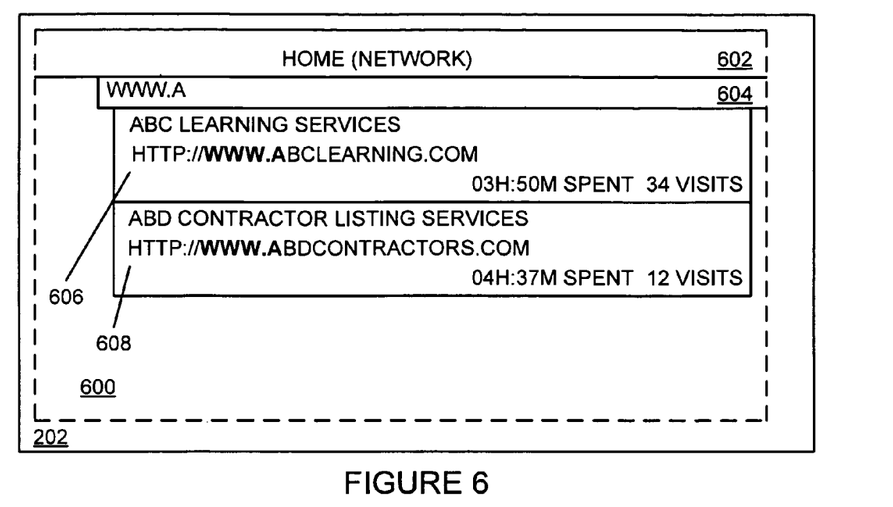
FIG. 6 is a magnified view of an example of an implementation of a portion of a graphical user interface (GUI) displayed on a display of a computing device that illustrates browser history information selection and sorting based upon a location profile associated with a home environment according to an embodiment of the present subject matter.

FIG. 6 is a magnified view of an example of an implementation of a portion of a graphical user interface (GUI) 600 displayed on the display 202 of the computing device 114 that illustrates browser history information selection and sorting based upon a location profile associated with the home environment 102. It is assumed for purposes of the present example that the computing device 114 is located within the home environment 102 and that a process similar to the process 500 described in association with FIG. 5 above has executed to automatically select a location profile named "HOME (NETWORK)." The dashed lines within FIG. 6 illustrate that the GUI 600 is larger than the portion illustrated within FIG. 6. As can be seen from FIG. 6, the location profile name "HOME (NETWORK)" is displayed within a status area 602.

Within a text entry area 604, the user has typed the text "www. a" to begin selection of a web site to access from the home environment 102. Browser history information associated with the home location profile appears within browser history areas 606 and 608 as the user types. As can be seen from FIG. 6, the browser history information is displayed in alphabetical order for ease of illustration. Many other arrangements of the browser history information are possible and all are considered within the scope of the present subject matter. Additionally, portions of the browser history URLs that match what the user has typed are illustrated in a bold font for ease of illustration purposes. It is assumed for purposes of the present example that the browser history entries are of interest to the user of the computing device 114 while not working and generally while the user is using the computing device 114 within the home environment 102.

As can also be seen from FIG. 6, additional information has been tracked, stored, and displayed in association with each item of browser history information. Within the present example, a name of the web site associated with each item of browser history information, a total time in hours and minutes spent at each web site, and a total number of visits to each web site are illustrated within the browser history areas 606 and 608. Many other types of information may be tracked, stored, and displayed in association with the browser history information and all are considered within the scope of the present subject matter.

Figure 7:
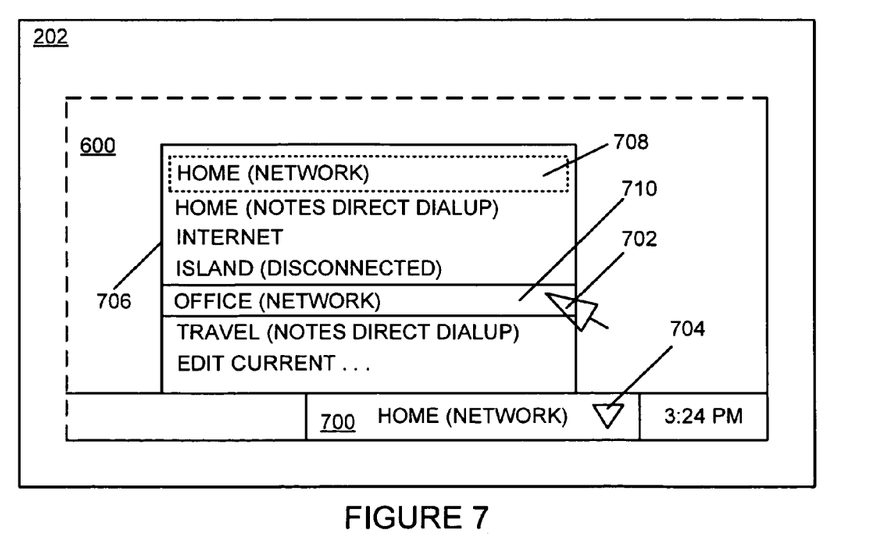
FIG. 7 is a magnified view of an example of an implementation of another portion of the graphical user interface (GUI) of FIG. 6 displayed on a display of a computing device to illustrate user-override capabilities for override of an automatically selected location profile within a home environment according to an embodiment of the present subject matter.

FIG. 7 is a magnified view of an example of an implementation of another portion of the graphical user interface (GUI) 600 of FIG. 6 displayed on the display 202 of the computing device 114 to illustrate user-override capabilities for override of an automatically selected location profile within the home environment 102. As with FIG. 6 above, it is assumed for purposes of the present example that the computing device 114 is located within the home environment 102 and that a process similar to the process 500 described in association with FIG. 5 above has executed to automatically select a location profile named "HOME (NETWORK)." The dashed lines illustrate that the GUI 600 is larger than the portion illustrated within FIG. 7. As can be seen from FIG. 7, the location profile name "HOME (NETWORK)" is also displayed within a status area 700.

Within the present example, it is assumed that the user previously hovered a cursor element 702 over a selection element 704 associated with the status area 700 or selected the selection element 704 with the cursor element 702 to cause a location profile selection area 706 to be displayed above the status area 700. The user's selection of the selection element 704 is not illustrated for ease of illustration purposes. Within the location profile selection area 706, the currently selected location profile is highlighted. For purposes of the present subject matter, the selected location profile may be highlighted in any convenient fashion. Within FIG. 7, the "HOME (NETWORK)" location profile is highlighted with a dashed outline 708 for ease of illustration purposes. Any other form of highlighting may be used and all are considered within the scope of the present subject matter. Based upon the example within FIG. 7, it can be seen that there are two "home" location profiles, and that the network-based location profile was prioritized over a dial-up home location profile.

Continuing with the present example, it is assumed that the user has moved the cursor element 702 to a selectable element 710. The selectable element 710 represents a location profile associated with the work environment 106 titled "OFFICE (NETWORK)." As will be described in more detail below in association with FIG. 8, for purposes of the present example, it is assumed that the user selected the selectable element 710 to override the automatically selected location profile named "HOME (NETWORK)."

Figure 8:
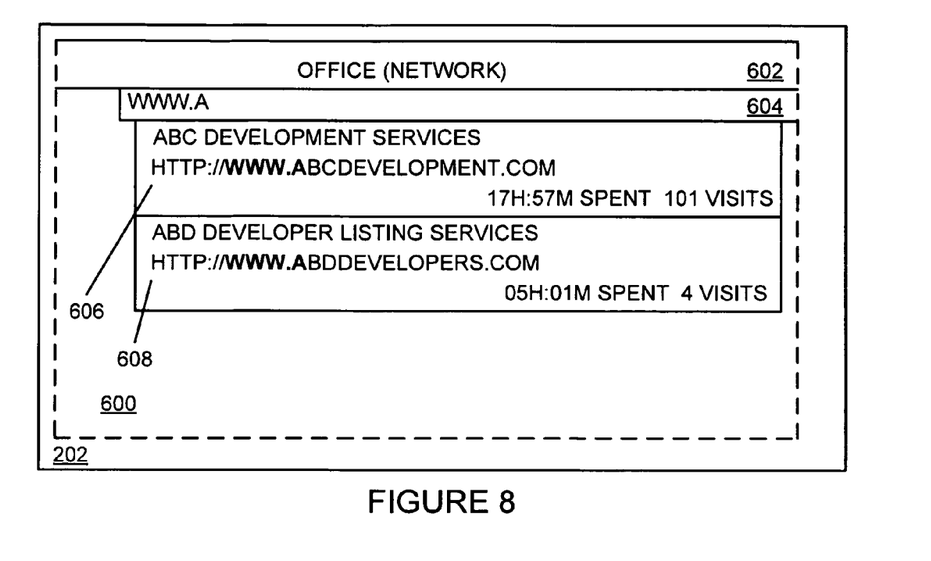
FIG. 8 is a magnified view of an example of an implementation of a portion of the graphical user interface as represented within FIG. 6 that displays user override-selected location profile information according to an embodiment of the present subject matter.

FIG. 8 is a magnified view of an example of an implementation of a portion of the graphical user interface 600 as represented within FIG. 6 that displays user override-selected location profile information. As described above in association with FIG. 7, the user of the computing device 114 selected the "OFFICE (NETWORK)" location profile to access browser history information associated with that location profile. As with FIG. 6, dashed lines illustrate that the GUI 600 is larger than the portion illustrated within FIG. 8. As can be seen from FIG. 8, the location profile name "OFFICE (NETWORK)" is displayed within the status area 602.

Within the text entry area 604, the user has again typed the text "www.a" to begin selection of a web site to access from the home environment 102 using the office location profile. Alternatively, the text previously typed may be used to automatically filter the browser history information associated with the selected office location profile. Browser history information associated with the office location profile appears within browser history areas 606 and 608. As can be seen from FIG. 8, the browser history information is again displayed in alphabetical order for ease of illustration. Many other arrangements of the browser history information are possible and all are considered within the scope of the present subject matter. It is assumed for purposes of the present example that the browser history entries are of interest to the user of the computing device 114 while working and generally while the user is using the computing device 114 within the work environment 106. It should be noted that the browser history information illustrated within FIG. 8 is different from the browser history information illustrated within FIG. 6. Additionally, it should be noted that the browser history information illustrated within each of FIG. 6 and FIG. 8 is not crowded with information associated with the other location profile, thereby enhancing the user's experience of using the computing device 114.

As can also be seen from FIG. 8, additional information has been tracked, stored, and displayed in association with each item of browser history information. Within the present example, a name of the web site associated with each item of browser history information, a total time in hours and minutes spent at each web site, and a total number of visits to each web site are illustrated within the browser history areas 606 and 608. Many other types of information may be tracked, stored, and displayed in association with the browser history information and all are considered within the scope of the present subject matter.

Figure 9:
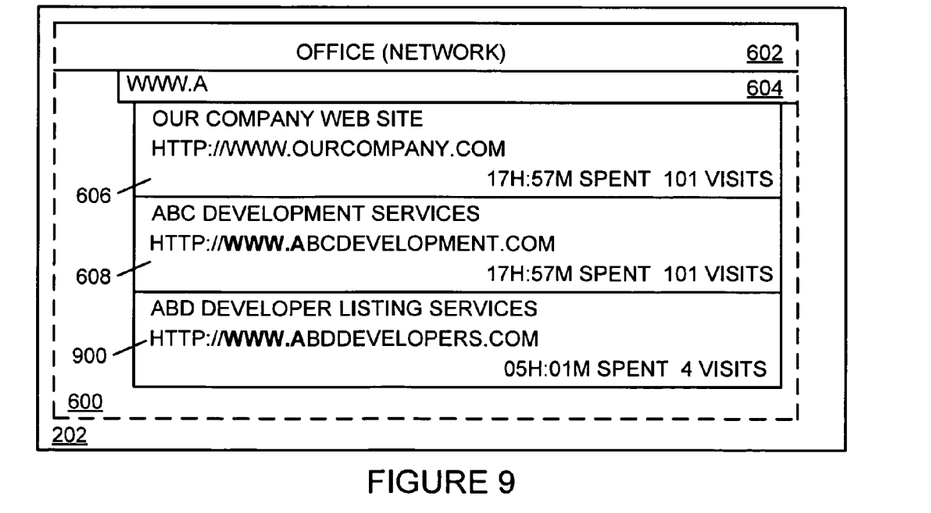
FIG. 9 is a magnified view of an example of an implementation of a portion of the graphical user interface as represented within FIG. 8 that illustrates that the user has specified that a particular web site is to be prioritized over all other web sites associated with an office location profile according to an embodiment of the present subject matter

FIG. 9 is a magnified view of an example of an implementation of a portion of the graphical user interface 600 as represented within FIG. 8 that illustrates that the user has specified that a particular web site is to be prioritized over all other web sites associated with the office location profile. As can be seen from FIG. 9, a company web site address is displayed as a top entry within the browser history area 606, while the previous entries from FIG. 8 are illustrated within the browser history area 608 and a browser history area 900. Accordingly, the company web site address has been prioritized within the office location profile to be displayed before any other sorted or filtered browser history information and is not affected by subsequent text entry by the user. Accordingly, the user of the computing device 114 may readily access company information, such as communication groups, without extensive searching or typing within the text entry area 604.

As described above in association with FIGS. 1 through 9, the example systems and processes provide automated sorting of browser history information based upon a physical and/or logical location of a computing device, such as a portable computing device. Furthermore, multiple logical locations may be associated with a single physical location, such as by use of different home office and recreation network connections or different location profiles. One or more location profiles that include sorting, prioritizing, and/or filtering preferences are associated with each location. The location is automatically determined by identification of location information, such as a network sub-address, global positioning satellite (GPS) coordinates, or other location identifier. The user may select a location profile different from the automatically selected location profile. Prioritizing includes presenting browser history information associated with the location before browser history information associated with a different location. Filtering includes presenting only browser history information associated with the physical and/or logical location. Browser history information may be designated and prioritized to be displayed before other sorted or filtered browser history information. Additional information may be associated with the browser history information, such as a number of previous accesses, time accessed, and other web site history information. Many other variations and additional activities associated with automated sorting of browser history information based upon a physical and/or logical location of a computing device are possible and all are considered within the scope of the present subject matter.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

Those skilled in the art will recognize improvements and modifications to the preferred embodiments of the present invention. All such improvements and modifications are considered within the scope of the concepts disclosed herein and the claims that follow.

What is claimed is:

1. A method comprising:
   determining a current computing device use location associated with a computing device used by a user at multiple different computing device use locations;
   retrieving, in response to determining the current computing device use location associated with the computing device, web browser history information from a storage device, where the web browser history information comprises:
   web browser history entries that each identify at least a website previously visited via a browser; and
   web browser history entry location information that distinguishes individual web browser history entries associated with the current computing device use location from individual web browser history entries associated with different ones of the multiple different computing device use locations;
   sorting the web browser history information based upon the determined current computing device use location using the web browser history entry location information within the web browser history information that distinguishes the individual web browser history entries associated with the current computing device use location from the individual web browser history entries associated with the different ones of the multiple different computing device use locations; and
   presenting the sorted web browser history information comprising only the individual web browser history entries associated with the determined current computing device use location to the user of the computing device.

2. The method of claim 1, where determining the current computing device use location associated with the computing device used by the user at the multiple different computing device use locations comprises determining at least one of a current sub-network address associated with a current network connection of the computing device, current global positioning satellite (GPS) coordinates associated with the computing device, and a currently selected user web browser location profile associated with the computing device.

3. The method of claim 1, where sorting the web browser history information based upon the determined current computing device use location using the web browser history entry location information within the web browser history information that distinguishes the individual web browser history entries associated with the current computing device use location from the individual web browser history entries associated with the different ones of the multiple different computing device use locations comprises:
   filtering the web browser history information to retain only the individual web browser history entries associated with the determined current computing device use location.

4. The method of claim 1, further comprising storing a value based upon the determined current computing device use location to a location variable within the storage device.

5. The method of claim 1, where:
   at least one item of the web browser history information comprises a hyperlink to a uniform resource locator (URL) associated with a website and information associated with at least one previous access to the website; and
   further comprising presenting the hyperlink to the URL associated with the website and the information associated with the at least one previous access to the website to the user of the computing device with the at least one item of the web browser history information.

6. The method of claim 1, where determining the current computing device use location associated with the computing device used by the user at the multiple different computing device use locations comprises selecting the current computing device use location from a group consisting of a home computing device use location, a work computing device use location, and a school computing device use location.

7. The method of claim 1, further comprising storing the sorted web browser history information to the storage device.

8. A system comprising:
   a memory configured to store web browser history information;
   a display configured to present information; and
   a computing device programmed to:
   determine a current computing device use location associated with the computing device used by a user at multiple different computing device use locations;
   retrieve, in response to determining the current computing device use location associated with the computing device, the web browser history information from the memory, where the web browser history information comprises:
   web browser history entries that each identify at least a website previously visited via a browser; and
   web browser history entry location information that distinguishes individual web browser history entries associated with the current computing device use location from individual web browser history entries associated with different ones of the multiple different computing device use locations;
   sort the web browser history information based upon the determined current computing device use location using the web browser history entry location information within the web browser history information that distinguishes the individual web browser history entries associated with the current computing device use location from the individual web browser history entries associated with the different ones of the multiple different computing device use locations; and present the sorted web browser history information comprising only the individual web browser history entries associated with the determined current computing device use location to the user of the computing device on the display.

9. The system of claim 8, where, in being programmed to determine the current computing device use location associated with the computing device used by the user at the multiple different computing device use locations, the computing device is programmed to determine at least one of a current sub-network address associated with a current network connection of the computing device, current global positioning satellite (GPS) coordinates associated with the computing device, and a currently selected user web browser location profile associated with the computing device.

10. The system of claim 8, where, in being programmed to sort the web browser history information based upon the determined current computing device use location using the web browser history entry location information within the web browser history information that distinguishes the individual web browser history entries associated with the current computing device use location from the individual web browser history entries associated with the different ones of the multiple different computing device use locations, the computing device is programmed to:

filter the web browser history information to retain only the individual web browser history entries associated with the determined current computing device use location.

11. The system of claim 8, where the computing device is further programmed to store a value based upon the determined current computing device use location to a location variable within the memory.

12. The system of claim 8, where:

at least one item of the web browser history information comprises a hyperlink to a uniform resource locator (URL) associated with a website and information associated with at least one previous access to the website; and the computing device is further programmed to present the hyperlink to the URL associated with the website and the information associated with the at least one previous access to the website to the user of the computing device with the at least one item of the web browser history information on the display.

13. The system of claim 8, where, in being programmed to determine the current computing device use location associated with the computing device used by the user at the multiple different computing device use locations, the computing device is programmed to select the current computing device use location from a group consisting of a home computing device use location, a work computing device use location, and a school computing device use location.

14. The system of claim 8, where the computing device is further programmed to store the sorted web browser history information to the memory.

15. A system comprising:

a memory configured to store web browser history information;

a display configured to present information; and a computing device programmed to:

determine a current computing device use location associated with the computing device used by a user at multiple different computing device use locations based upon at least one of a current sub-network address associated with a current network connection of the computing device, current global positioning satellite (GPS) coordinates associated with the computing device, and a currently selected user location profile associated with the computing device;

store a value based upon the determined current computing device use location to a location variable within the memory;

retrieve, in response to determining the current computing device use location associated with the computing device, web browser history information from the memory, where the web browser history information comprises:

web browser history entries that each identify at least a website previously visited via a browser; and web browser history entry location information that distinguishes individual web browser history entries associated with the current computing device use location from individual web browser history entries associated with different ones of the multiple different computing device use locations;

sort the web browser history information based upon the determined current computing device use location represented by the value stored to the location variable within the memory using the web browser history entry location information within the web browser history information that distinguishes the individual web browser history entries associated with the current computing device use location from the individual web browser history entries associated with the different ones of the multiple different computing device use locations;

store the sorted web browser history information to the memory; and present the sorted web browser history information comprising only the individual web browser history entries associated with the determined current computing device use location to the user of the computing device on the display.

16. A computer program product comprising a computer useable storage memory including a computer readable program, wherein the computer readable program when executed on a computing device causes the computing device to:

determine a current computing device use location associated with the computing device, where the computing device is used by a user at multiple different computing device use locations;

retrieve, in response to determining the current computing device use location associated with the computing device, web browser history information from a memory, where the web browser history information comprises:

web browser history entries that each identify at least a website previously visited via a browser; and web browser history entry location information that distinguishes individual web browser history entries associated with the current computing device use location from individual web browser history entries associated with different ones of the multiple different computing device use locations;

sort the web browser history information based upon the determined current computing device use location using the web browser history entry location information within the web browser history information that distinguishes the individual web browser history entries associated with the current computing device use location from the individual web browser history entries associated with the different ones of the multiple different computing device use locations; and present the sorted web browser history information comprising only the individual web browser history entries associated with the determined current computing device use location to the user of the computing device on a display.

17. The computer program product of claim 16, where, in causing the computing device to determine the current computing device use location associated with the computing device used by the user at the multiple different computing device use locations, the computer readable program when executed on the computing device causes the computing device to determine at least one of a current sub-network address associated with a current network connection of the computing device, current global positioning satellite (GPS) coordinates associated with the computing device, and a currently selected user web browser location profile associated with the computing device.

18. The computer program product of claim 16, where, in causing the computing device to sort the web browser history information based upon the determined current computing device use location using the web browser history entry location information within the web browser history information that distinguishes the individual web browser history entries associated with the current computing device use location from the individual web browser history entries associated with the different ones of the multiple different computing device use locations, the computer readable program when executed on the computing device causes the computing device to:

filter the web browser history information to retain only the individual web browser history entries associated with the determined current computing device use location.

19. The computer program product of claim 16, where the computer readable program when executed on the computing device further causes the computing device to store a value based upon the determined current computing device use location to a location variable within the memory.

20. The computer program product of claim 16, where:

at least one item of the web browser history information comprises a hyperlink to a uniform resource locator (URL) associated with a website and information associated with at least one previous access to the website; and the computer readable program when executed on the computing device further causes the computing device to present the hyperlink to the URL associated with the website and the information associated with the at least one previous access to the website to the user of the computing device with the at least one item of the web browser history information on the display.

21. The computer program product of claim 16, where, in causing the computing device to determine the current computing device use location associated with the computing device used by the user at the multiple different computing device use locations, the computer readable program when executed on the computing device causes the computing device to select the current computing device use location from a group consisting of a home computing device use location, a work computing device use location, and a school computing device use location.

22. The computer program product of claim 16, where the computer readable program when executed on the computing device further causes the computing device to store the sorted web browser history information to the memory.

* * * * *